US007481037B2

(12) United States Patent
Takaya et al.

(10) Patent No.: US 7,481,037 B2
(45) Date of Patent: Jan. 27, 2009

(54) COOLING STRUCTURE OF GAS TURBINE TAIL PIPE

(75) Inventors: Hiroya Takaya, Hyogo (JP); Masao Terazaki, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 160 days.

(21) Appl. No.: 10/526,218

(22) PCT Filed: Dec. 22, 2003

(86) PCT No.: PCT/JP03/16484

§ 371 (c)(1), (2), (4) Date: Mar. 1, 2005

(87) PCT Pub. No.: WO2005/005888

PCT Pub. Date: Jan. 20, 2005

(65) Prior Publication Data

US 2005/0241314 A1 Nov. 3, 2005

(30) Foreign Application Priority Data

Jul. 14, 2003 (JP) ............................ 2003-196247

(51) Int. Cl.
*F02C 7/18* (2006.01)
*F23R 3/42* (2006.01)

(52) U.S. Cl. .......................... 60/39.37; 60/752; 60/800

(58) Field of Classification Search ................ 60/39.37, 60/752, 800
See application file for complete search history.

(56) References Cited

U.S. PATENT DOCUMENTS 3,652,181 A * 3/1972 Wilhelm, Jr. ................. 60/748
4,010,531 A * 3/1977 Andersen et al. .......... 416/97 R
4,695,247 A * 9/1987 Enzaki et al. ................. 60/754
5,400,586 A 3/1995 Bagepalli et al.
6,018,950 A * 2/2000 Moeller ....................... 60/752
6,302,642 B1 * 10/2001 Nagler et al. ............... 415/116
6,345,494 B1 * 2/2002 Coslow ..................... 60/39.37

(Continued)

FOREIGN PATENT DOCUMENTS

JP 61-141565 9/1986

(Continued)

OTHER PUBLICATIONS

Japanese Office Action issued Apr. 1, 2008 in Japanese Application No. 2003-196247.

*Primary Examiner*—Ted Kim
(74) *Attorney, Agent, or Firm*—Wenderoth, Lind & Ponack, L.L.P.

(57) ABSTRACT

A plate spring 6 having a hook-shaped cross section from the lower part is installed in the neighborhood of one end "b" of an impingement-cooling plate 4. One end "c" on the lower side is fixed to a rib 1*d* by welding, while the other end "b" on the upper side is free, which makes it closely contact with the neighborhood of the other end "b" of the impingement-cooling plate 4 by the elastic force thereof. This state makes it possible to seal a gap formed between the impingement-cooling plate 4 and a transition piece 1 on the side of a rib 1*d*, preventing thermal stress generated in the rib 1*d*, for example, from affecting the impingement-cooling plate 4.

6 Claims, 9 Drawing Sheets

U.S. PATENT DOCUMENTS 6,751,962 B1 * 6/2004 Kuwabara et al. ............. 60/800

FOREIGN PATENT DOCUMENTS

JP 62-218732 9/1987
JP 62-288328 * 12/1987
JP 63-80021 4/1988
JP 63-131924 6/1988
JP 63-134821 6/1988
JP 3-1015 1/1991
JP 10-68523 3/1998
JP 2002-511126 4/2002
JP 2003-065071 * 3/2003
JP 2003-65071 3/2003

* cited by examiner

COOLING STRUCTURE OF GAS TURBINE TAIL PIPE

TECHNICAL FIELD

The present invention relates to a construction that cools the outlet of a transition piece of a gas turbine by using cooling air.

BACKGROUND ART

Conventionally, gas turbines have transition pieces installed thereto for leading combustion gas of high temperature and high pressure generated in a combustor to a turbine portion efficiently. The inlet portion of such a transition piece has a configuration so as to be connected to a combustor basket where combustion gas is generated, while the outlet portion thereof is configured so as to be connected to a flow path of the turbine. The shell portion of a transition piece has a welded construction in which plates having cooling holes are combined. Furthermore, the outlet portion has a rib mounted thereon for reinforcement.

Additionally, a transition piece seal is arranged to each of the inside diameter side and the outside diameter side at the outlet of the transition piece, thereby restraining leakage of the cooling air from a portion connected to the turbine portion. In this way, by introducing the cooling air to the outlet portion of the transition piece and by preventing the cooling air from leaking with the transition piece seal, the outlet of a transition piece is cooled by using the outlet air of a compressor. The construction of a conventional combustor of a gas turbine will be explained again hereinafter by referring to the drawings.

FIG. 8 is a schematic drawing showing a conventional combustor of a gas turbine. FIG. 9 is a view of a transition piece of the combustor seen from the outlet side. In FIG. 8, a combustor 100 of a gas turbine consists of a combustor basket 110 of a cylindrical shape and a transition piece 120 which is to be engaged into an opening 111 of the combustor basket 110. The transition piece 120 is comprised of a member of a cylindrical shape and has the opening 111 of the combustor basket 110 inserted and engaged into an inlet portion 121 thereof.

The transition piece 120 has a cross-sectional area thereof gradually narrowed from the inlet portion 121 thereof, and as shown in FIG. 9, the outlet portion 122 thereof is shaped in a rectangle that is curved to be shaped into a sector. An illustration is omitted to indicate the above-mentioned welded construction of a shell portion of the transition piece 120 in which plates having cooling holes are combined. The transition piece 120 has the outlet portion 122 thereof equipped with a seal-support portion 123 of a circular shape and which has a concave cross section on its periphery. The seal-support portion 123 is engaged with the outlet portion 122 of the transition piece 120 and fixed by welding.

Now, back to FIG. 8, the combustor 100 of the gas turbine has the outlet portion 122 of the transition piece 120 connected to a combustion passageway 210 of a turbine 200. The inlet of the combustion passageway 210 is formed by an inner shroud 230 and an outer shroud 240 which support Turbine Row 1 stationary blades 220 on both ends. The transition piece 120 has the outlet portion 122 thereof located at the inlet of the combustion passageway 210 and fixed to a casing (not illustrated). A gap between the outlet portion 122 of the transition piece 120 and the combustion passageway 210 of the turbine 200 is sealed by a circular sealing member 125 that has a y-shaped cross-sectional configuration.

The sealing member 125 has a hook-shaped tip 126 thereof inserted into a concave portion of the seal-support portion 123 which is provided to the outlet 122 of the transition piece 120 and has a forked-into-two portion 127 thereof engaged with the shrouds 230 and 240 of Turbine Row 1 stationary blades 220. In a combustor 100 of this gas turbine, pre-mixed air generated in the combustor basket 110 and ignited is ejected into a combustion room 128 of the transition piece 120 and burns, becoming a high temperature combustion gas. The combustion gas proceeds through the inside of the transition piece 120 and is then blown into the combustion passageway 210 of the turbine 200 from the outlet portion 122 thereof as shown with arrow marks C.

As an embodiment of a cooling construction of the above-mentioned transition piece is disclosed a cooling panel of a gas turbine. (For example, see Japanese Patent Application Published 2002-511126.) Also, a combustor of a gas turbine is disclosed. (See Japanese Patent Application Laid Open 2003-65071, for example.)

However, the above-mentioned conventional cooling construction of a transition piece has a non-uniform cooling effect at the outlet portion of a transition piece, and there is a potentiality of deformation caused by having this portion exposed to combustion gas and heated.

SUMMARY OF THE INVENTION

It is an object of the present invention to provide a cooling construction of a transition piece of a gas turbine which can enhance a cooling effect at the outlet portion of the transition piece even though it is constructed in a simple manner.

In order to achieve the above-mentioned object, according to the present invention, a gas turbine has two protrusions mounted in a vertical direction to the main stream in the transition piece, outside of the inside diameter of the gas turbine and in the neighborhood of the outlet portion of the transition piece. A multiple-holed plate is mounted between the protrusions by fixing it to one protrusion only.

Additionally, in the neighborhood of the outlet portion of the transition piece and outside of the inside diameter of a gas turbine is mounted an impingement cooling plate which is fixed on only one side in a cantilever state. A gap is sealed by way of an elastic plate mounted between one end of the impingement cooling plate which is not fixed and the transition piece.

Furthermore, a surface confronting the impingement cooling plate of the transition piece has a plurality of cooling holes made therein horizontally, viewed in the direction of combustion gas flow. The cooling holes are arranged in a plurality of rows in the central portion of the transition piece only.

Moreover, each of a plurality of the transition pieces is provided with a respective transition piece seal and has a protrusion mounted on each end of the transition piece seals confronting each other, in a manner that the protrusions will overlap each other.

BEST MODE FOR CARRYING OUT OF THE INVENTION

Figure 1:
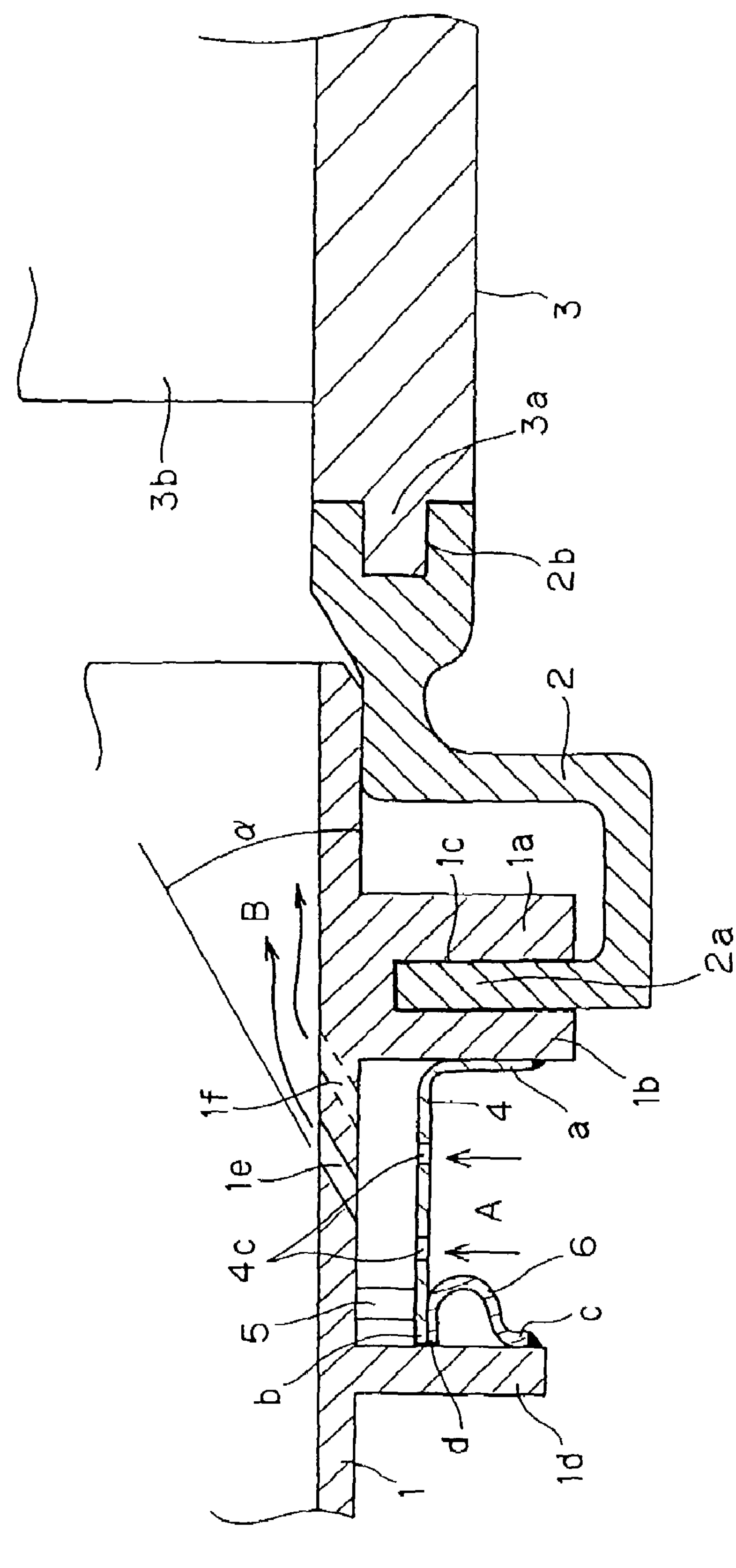
FIG. 1 is a schematic longitudinal cross-sectional view of a cooling construction of a transition piece of a gas turbine in accordance with an embodiment of the present invention.

Referring now to the drawings, an embodiment of the present invention will be described hereinafter. However, the present invention will not be limited to the following embodiments. FIG. 1 is a schematic longitudinal sectional view of a cooling construction of a transition piece of a gas turbine in accordance with an embodiment of the present invention. This figure shows the state in the neighborhood of the bottom part of an outlet portion of a transition piece. In this figure, 1 is a transition piece, 2 is a transition piece seal and 3 is a Row 1 vane shroud. On the bottom surface of an outlet portion of the transition piece 1, brim-shaped ribs 1*a* and 1*b* extend downward (toward the inside diameter of a gas turbine), having a slot portion 1*c* formed there-between.

Additionally, the transition piece seal 2, whose cross section is shaped approximately in a hook, has a rib 2*a*, rising in a shape of a brim on one end thereof, which is engaged with the above-mentioned slot portion 1*c*. On the other hand, the other end of the transition piece seal 2 has a slot portion 2*b* formed thereon, with which is engaged a rib 3*a* that extends from Row 1 vane shroud 3 on a turbine side to the transition piece side. As constructed above, the transition piece 1 and Row 1 vane shroud 3 are connected and sealed by the transition piece seal 2. Here, a portion 3*b* which extends upward (toward the outside diameter side of a gas turbine) from Row 1 vane shroud 3 depicts a stationary vane.

Furthermore, on the bottom surface of the transition piece 1 (namely, outside of the inside diameter side of the gas turbine), a brim-shaped rib 1*d* extends downward on the combustion gas upstream side of the rib 1*b*. Then, an impingement-cooling plate 4 whose cross section is approximately L-shaped and has a multiple number of holes therein is mounted horizontally, viewed in the direction of the combustion gas flow, between the ribs 1*b* and 1*d*. One end “a” on the narrow side of the cross section thereof is fixed to the rib 1*b* by welding, while the other end “b” on the wider side of the cross section covering the ribs 1*b* and 1*d* horizontally is a free end. In other words, the impingement-cooling plate 4 is fixed only on one end in a cantilever state. Additionally, the wider-side portion of the impingement-cooling plate 4 has impingement holes 4*c* made therein in two rows longitudinally (vertically to the paper).

In addition, in a neighborhood of the other end “b” of the impingement-cooling plate 4 stands a pin 5 in a space made with the bottom surface of the transition piece 1, which forms a pre-determined gap between the impingement-cooling plate 4 and the transition piece 1. On the other hand, in the neighborhood of the other end “b” of the impingement-cooling plate 4 is mounted a plate spring 6 whose cross section is shaped in a hook from the lower part. This makes it possible that one end “c” of the lower side is fixed to the rib 1*d* by welding, while the other end “d” on the upper side is free end, thereby getting in close contact with the neighborhood of the other end “b” of the impingement-cooling plate 4 by elastic force thereof. This ensures sealing of the above-mentioned gap which is formed between the impingement-cooling plate 4 and the transition piece 1 on the side of the rib 1*d*, for example, preventing thermal stress generated in the rib 1*d* from affecting the impingement-cooling plate 4.

Furthermore, although not illustrated, the impingement-cooling plate 4 may be constructed so as to be fixed to any one of the ribs only between the ribs 1*b* and 1*d* that are protruding from the bottom surface of the transition piece 1, without using the pin 5 and the plate spring 6. Concretely, for example, the impingement-cooling plate 4 may have one end “a” fixed to the rib 1*b* by welding and have the other end “b” be a free end, and thereby may have the other end “b” get in close contact with the rib 1*d* by elastic force thereof. This makes it possible to seal the above-mentioned gap formed between the impingement-cooling plate 4 and the transition piece 1 on the side of the rib 1*d*, avoiding thermal stress caused to the rib 1*d* from affecting the impingement-cooling plate 4, for example, thereby enabling a decrease in the number of components and reducing the number of man hours for manufacturing.

Moreover, on the bottom surface of the transition piece 1, cooling holes 1*e* and 1*f* are made therein between the ribs 1*b* and 1*d* (namely on a face confronting the impingement-cooling plate 4) sequentially from the combustion gas upstream side, forming a predetermined angle $\alpha$ with the bottom surface of the transition piece 1 toward the combustion gas downstream side. This is for intensively cooling a portion which reaches a high temperature by arranging cooling holes in two rows in the central portion at the outlet of the transition piece 1 only, while arranging them in one row in the surrounding neighborhood. This will be described in detail later. As shown with arrow marks A in the figure, compressed air from a compressor (not illustrated herein) once enters a gap between the impingement-cooling plate 4 and the transition piece 1 through the impingement holes 4*c*; flows into the inside of the transition piece 1 through the cooling holes 1*e* and 1*f*; and then, as shown with arrow marks B, flows along the inner wall surface of the transition piece 1, thus performing film-cooling.

The impingement-cooling plate 4 contributes to enhancement of impingement-cooling effect by having impingement holes 4*c*. Additionally, by optimizing the flow velocity of the cooling air flowing into the transition piece 1 and preventing it from entering the combustion gas vigorously, the film-cooling effect is enhanced. The angle $\alpha$ formed by the above-mentioned bottom surface of the transition piece 1 and the cooling holes 1*e* and 1*f* is approximately 30 degrees in the embodiment of the present invention. This is determined by the right balance between angle-formation and film-cooling effect but the present invention is not limited to this angle.

Figure 2:
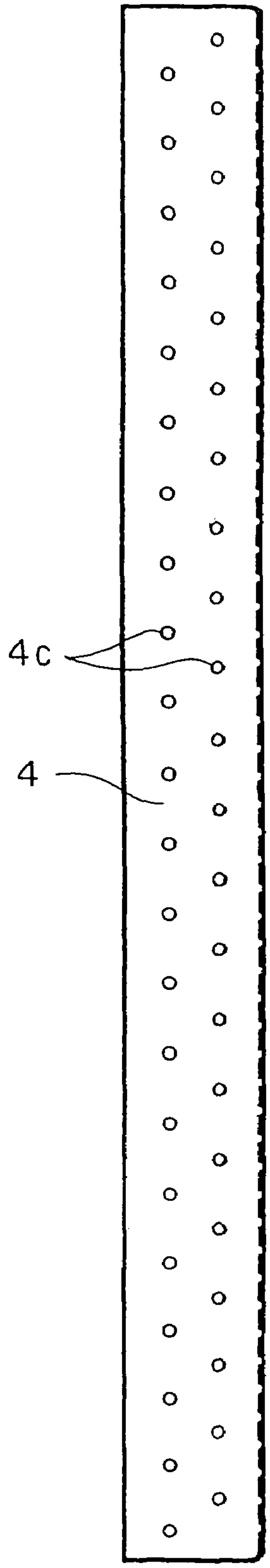
FIG. 2 is a plane view of an impingement cooling plate in accordance with the embodiment of the present invention.

FIG. 2 is a plane view showing the impingement-cooling plate in accordance with the embodiment of the present invention. In the embodiment of the present invention, as shown in the figure, impingement holes 4*c* are arranged in two rows in a zigzag pattern over the entire length longitudinally on the top surface (a face corresponding to the above-mentioned wider side) of the impingement-cooling plate 4. This makes it possible to achieve the impingement-cooling effect all over the entire length and entire width of the impingement-cooling plate 4. However, the arrangement of the impingement holes 4*c* are not limited to the construction in accordance with the embodiment of the present invention.

Figure 3:
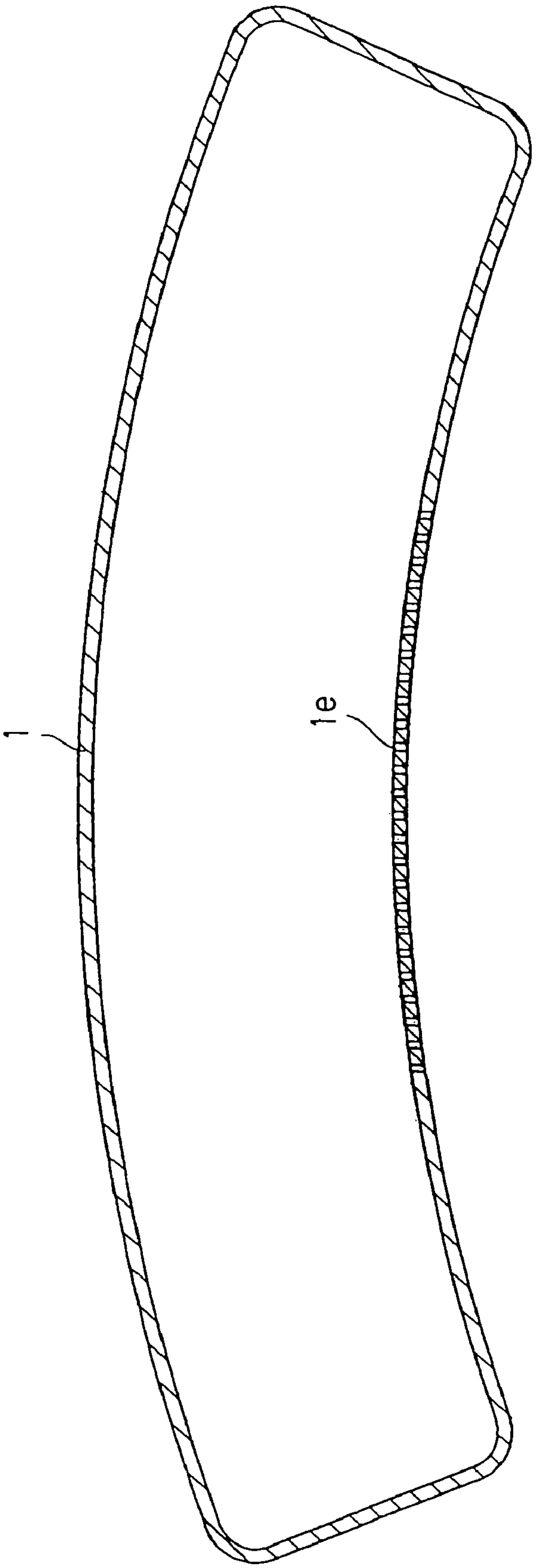
FIG. 3 is a cross-sectional view of a transition piece 1, including cooling holes 1*e*, viewed in the direction of the combustion gas flow.
Figure 4:
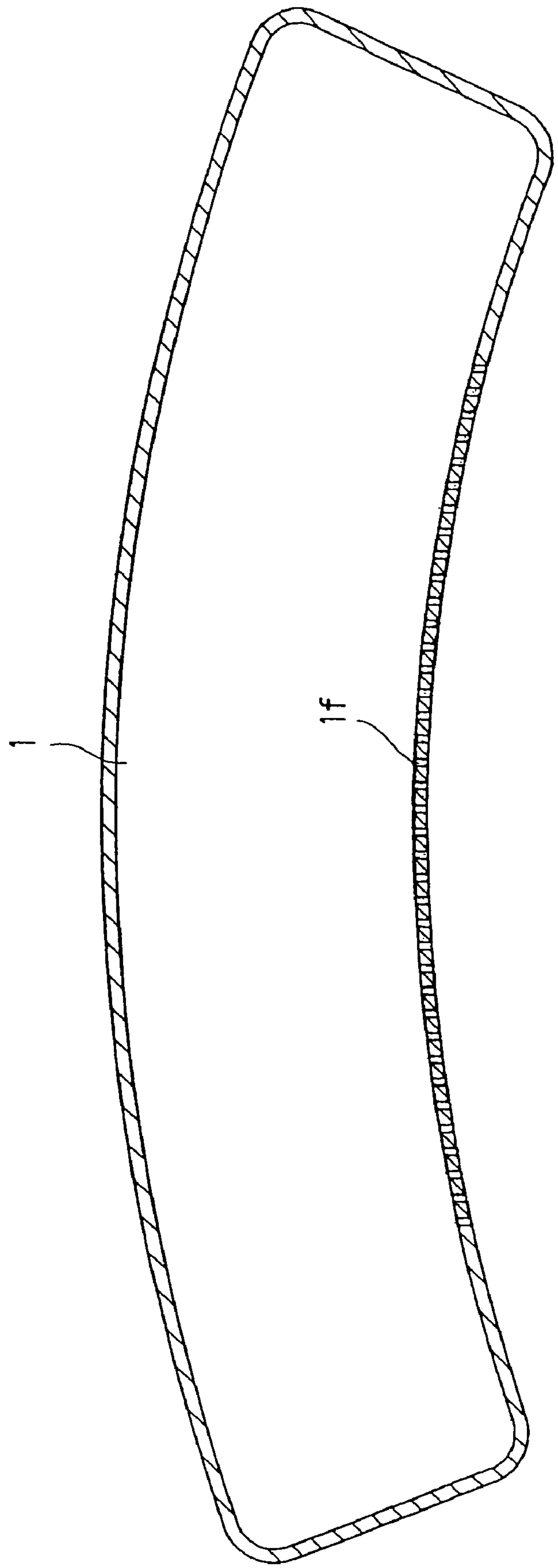
FIG. 4 is a cross-sectional view of a transition piece 1, including cooling holes 1*f*, viewed from the direction of combustion gas flow.
Figure 5:
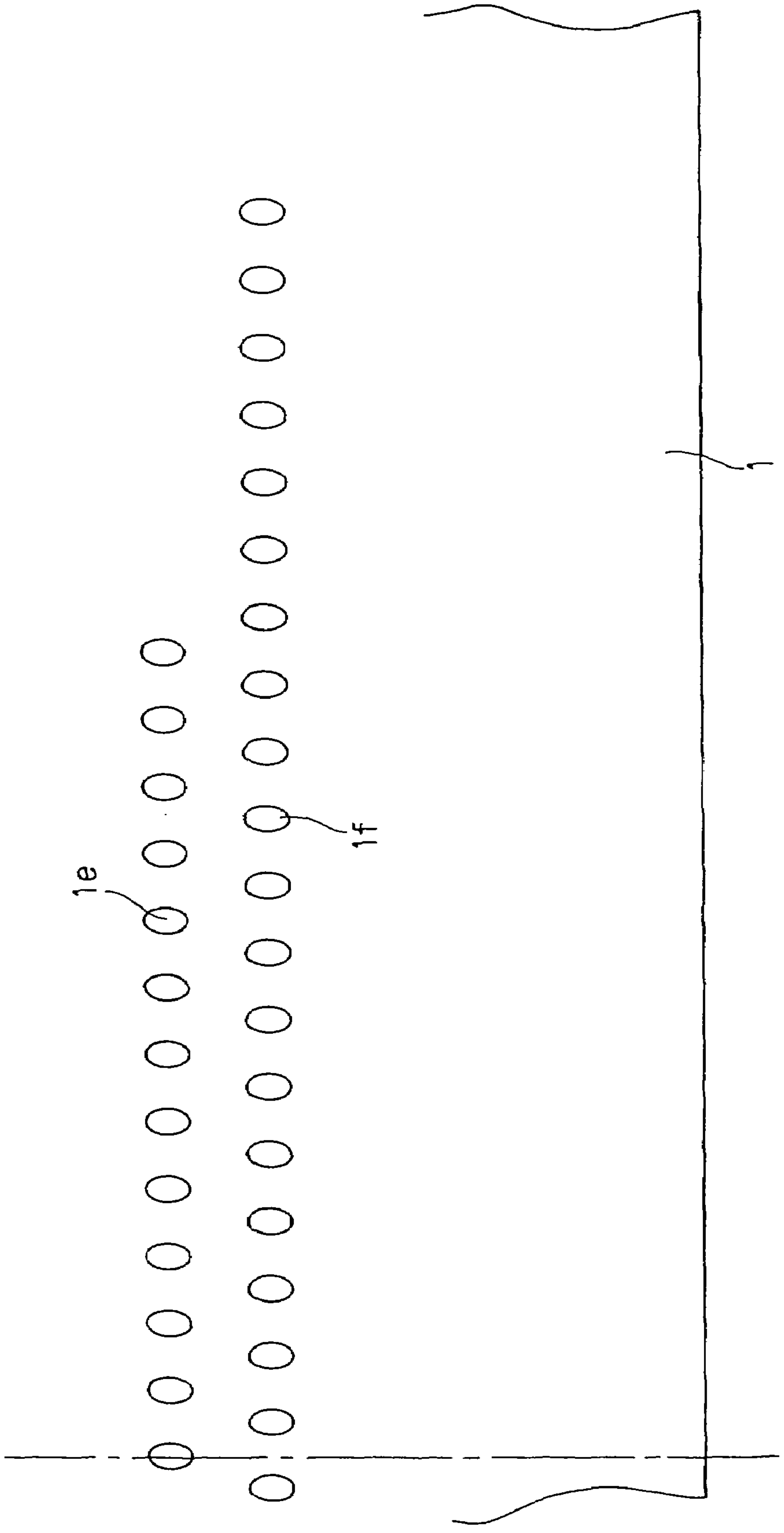
FIG. 5 depicts a bottom surface of a transition piece 1.

FIG. 3 through FIG. 5 show arrangements of cooling holes made in the transition piece in accordance with the embodiment of the present invention. First, FIG. 3 is a cross-sectional view of the transition piece 1 viewed in the direction of combustion gas flow, including cooling holes 1*e*. FIG. 4 is a cross-sectional view of the transition piece 1 viewed in the direction of combustion gas flow, including cooling holes 1*f*. FIG. 5 shows the bottom surface of the transition piece 1. This figure mainly depicts the arrangement on the right side, viewed from the downstream side of combustion gas.

As shown in these figures, a plurality of cooling holes 1*e* and 1*f* are arranged symmetrically in one row each on the bottom surface of the transition piece 1. The cooling holes 1*e* on the upstream side of the combustion gas are in a short row and are arranged in the central portion only. Namely, cooling holes are arranged in two rows in the central portion at the outlet of the transition piece only, while they are arranged in one row in the surrounding neighborhood, thereby achieving a construction to intensively cool the central portion, which reaches high temperature. However, the central portion may be constructed in such a manner as the cooling holes are arranged therein in a plurality of rows, which is not limited to two rows but may be more than two.

Figure 6B:
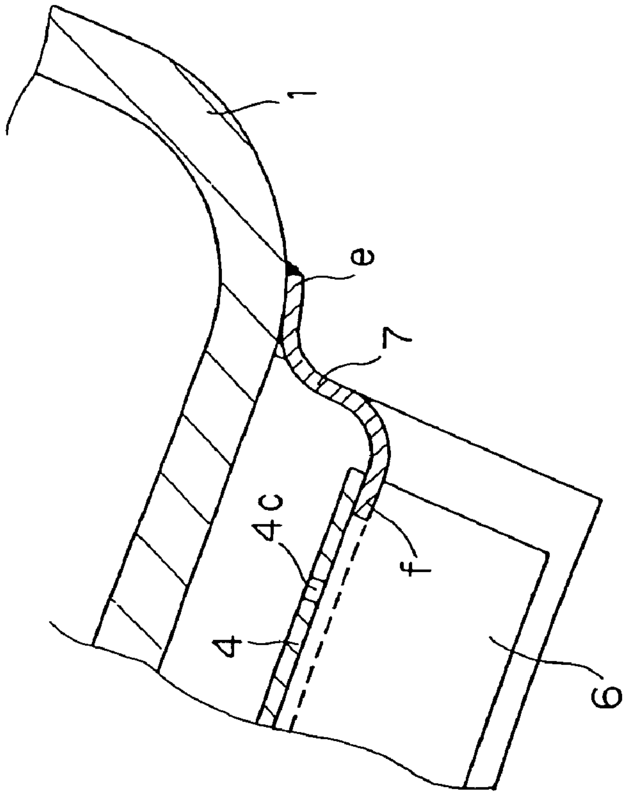
FIG. 6A and FIG. 6B are transverse sectional views depicting a construction of the neighborhood of the ends of the impingement cooling plate.
Figure 6A:
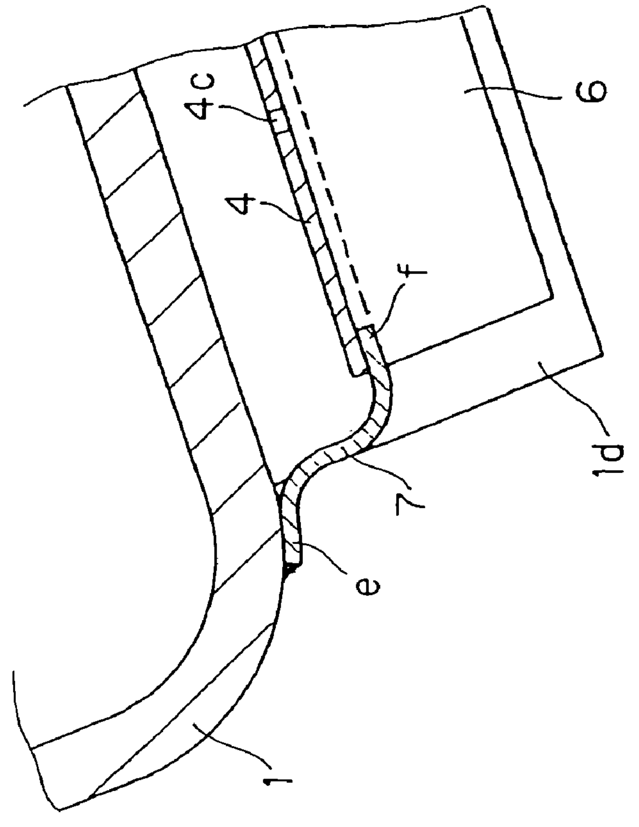

FIG. 6 is a transverse sectional view showing a construction of the neighborhood of an end portion of the impingement-cooling plate in accordance with the embodiment of the present invention. FIG. 6A shows the left side viewed from the downstream side of combustion gas and FIG. 6B shows the right side, respectively. As shown in these figures, in the neighborhood of each end portion of the impingement-cooling plate 4 is installed a cover plate 7 whose cross section is approximately shaped in a letter of S. One end "e" on the upper side thereof is fixed to the transition piece 1 by welding, while the other end "f" on the lower side thereof is a free end, which comes into contact with the bottom surface of the impingement-cooling plate 4 by its own elastic force.

The above-mentioned state will make it possible to avoid thermal stress generated to the rib 1*d* from affecting the impingement-cooling plate 4, for example, and to seal the above-mentioned gap formed between the impingement-cooling plate 4 and the transition piece 1 on both right and left sides thereof. By this sealing construction and by the above-mentioned sealing construction on the side of the rib 1*d*, compressed air from the compressor is introduced to the impingement hole 4*c* efficiently, thereby enhancing the impingement-cooling effect.

Figure 7:
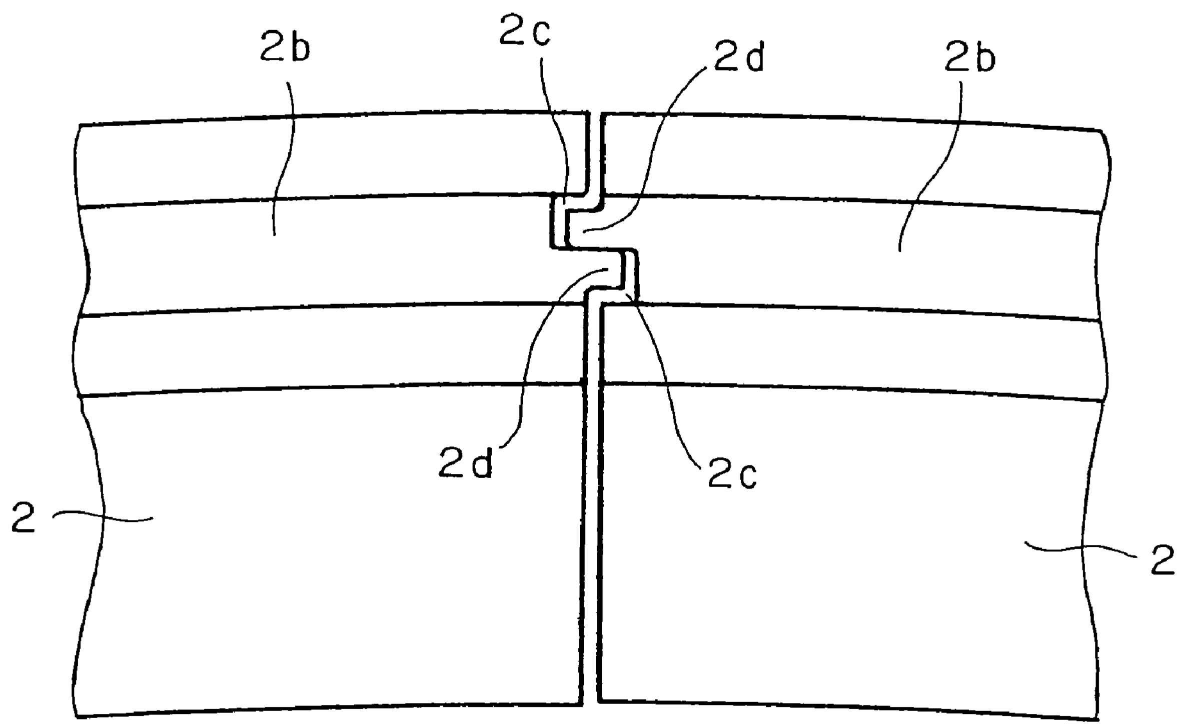
FIG. 7 depicts the construction of transition piece seals in accordance with the embodiment of the present invention.
Figure 8:
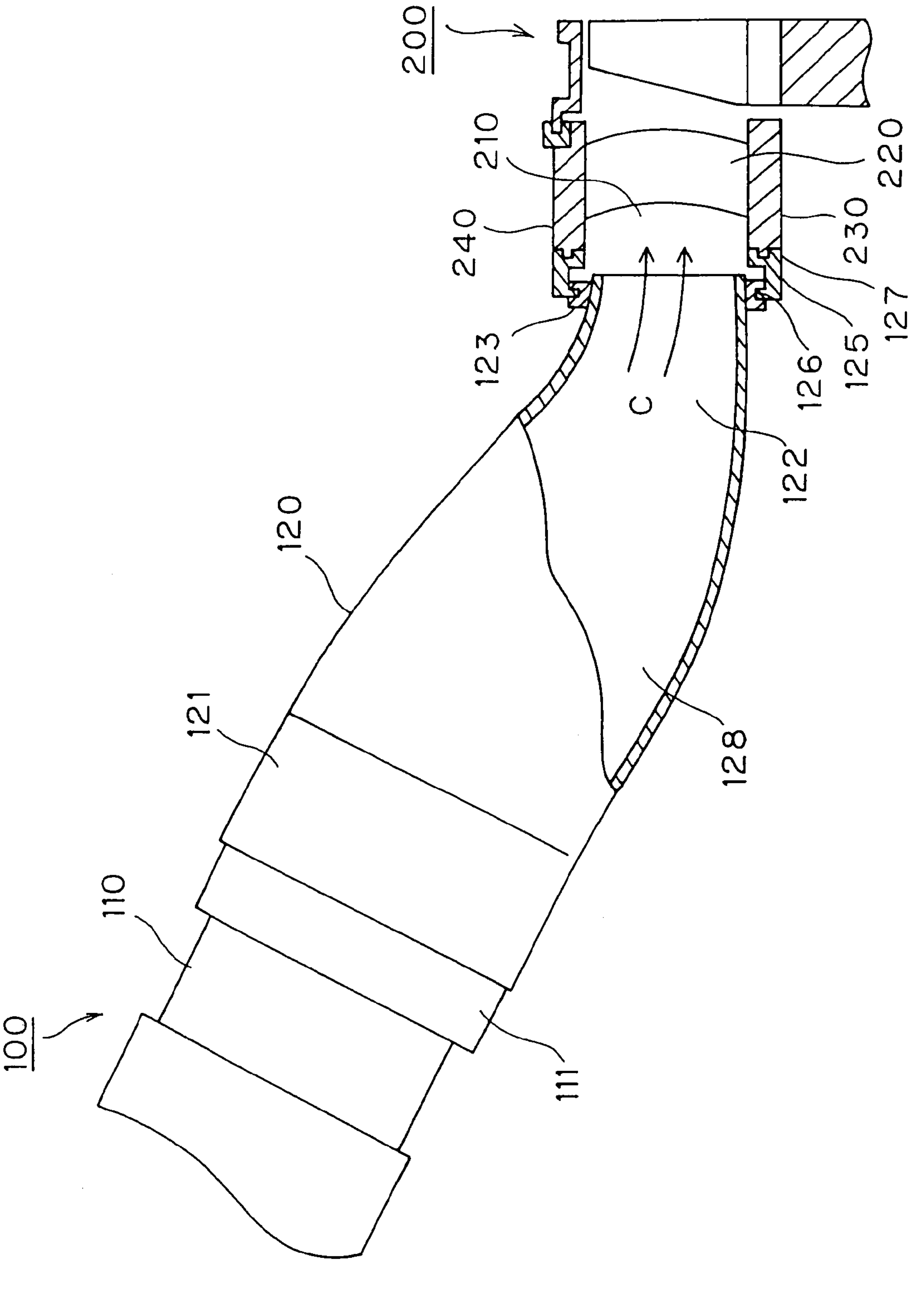
FIG.8 PRIOR ART
FIG. 8 is a schematic view showing a conventional combustor of a gas turbine.
Figure 9:
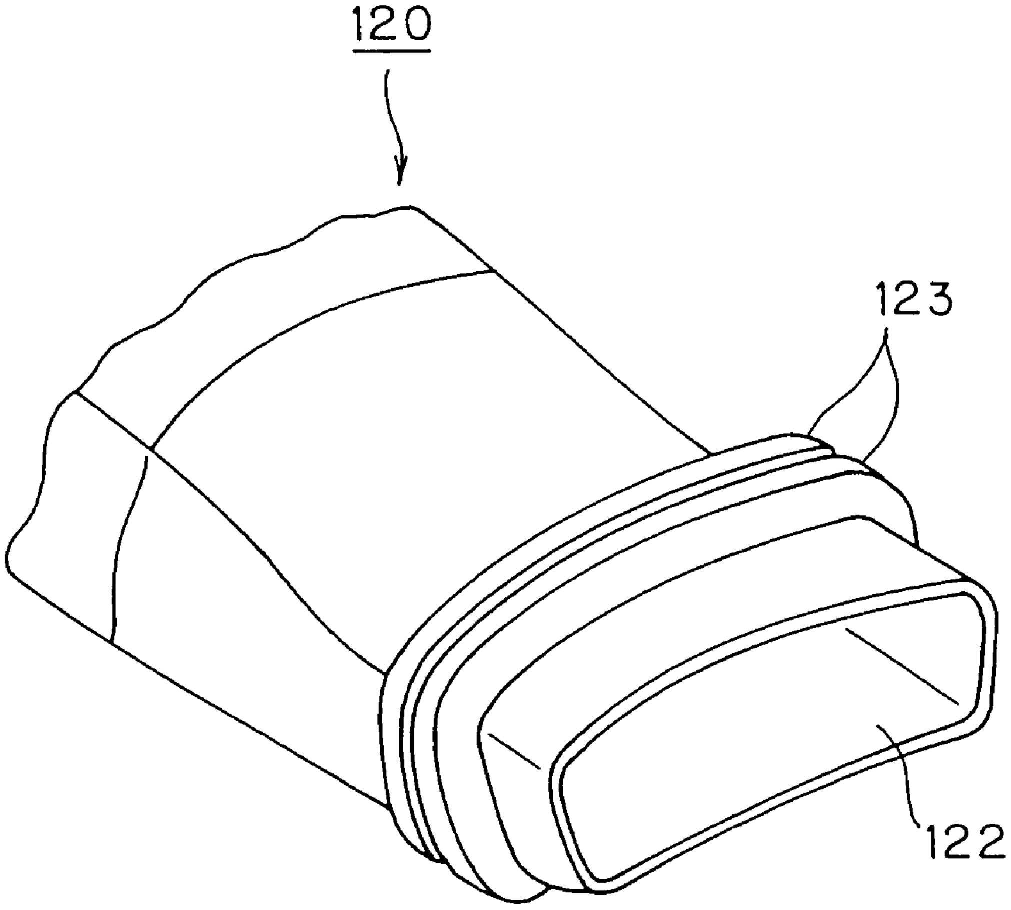
FIG.9 PRIOR ART
FIG. 9 is a view of a conventional transition piece of a combustor viewed from the outlet side.

FIG. 7 shows the construction of transition piece seals in accordance with the embodiment of the present invention. This figure shows the transition piece seal viewed from the downstream side of the combustion gas. As shown in the figure, the right end of the transition piece seal 2 on the left side as faced has a slot portion 2*c* and a protrusion portion 2*d* formed continuously thereon, and in order to engage into each portion respectively, a protrusion 2*d* and a slot portion 2*c* are mounted continuously on the left end of the transition piece seal on the right as faced. Then, the protrusions 2*d* engage into confronting slot portions 2*c* respectively so as to overlap each other.

A plurality of the transition piece seals 2 are provided not only to a combustor (which is not illustrated) but also to a transition piece, and are arranged all over the periphery of a gas turbine in successive contact with each other. A gap between the transition piece seals 2 is equipped with an overlapping construction as shown in FIG. 7, which makes it possible to prevent compression air from the compressor from leaking through the gap formed by the transition piece seals 2, thereby reducing worthless consumption of cooling air and enhancing the total cooling effect at the outlet of the transition piece.

As a result of achieving the cooling construction as mentioned above, compared with a conventional structure, a temperature decrease such as 56 to 102° C. in the central portion at the outlet of a transition piece and 9 to 23° C. in the surrounding neighborhood, for example, could be observed, and a favorable cooling effect was achieved.

While there have been described herein what are to be considered preferred embodiments of the present invention, other modifications and variations of the invention are possible to be practiced, provided all such modifications fall within the spirit and scope of the invention.

With the present invention, it is possible to provide a cooling construction of a transition piece of a gas turbine which is simply constructed but can enhance the cooling effect at the outlet portion of the transition piece.

What is claimed is:

1. A cooling construction of a transition piece of a gas turbine comprising:

a first protrusion and a second protrusion that are mounted on said transition piece orthogonally to a main stream direction of said transition piece on a gas turbine inside diameter side of said transition piece and adjacent to an outlet portion of said transition piece;

an impingement-cooling plate that is fixed at one end in a cantilever state to said first protrusion, and is contacted at a tip of the other end of said impingement-cooling plate with said second protrusion so as to move back and forth along said second protrusion in response to thermal stress generated therearound;

an elastic plate that is fixed at one end to said second protrusion, and is contacted at the other end of said elastic plate with said other end of said impingement-cooling plate; and a pin that is provided on said transition piece for securing a predetermined gap between said transition piece and said impingement-cooling plate, wherein said elastic plate seals a gap between said transition piece and said impingement-cooling plate.

2. The cooling construction of a transition piece of a gas turbine according to claim 1, further comprising:

a face of said transition piece, that confronts said impingement-cooling plate; and a plurality of cooling holes that is provided only on a central portion of said transition piece in a row extending across said face perpendicular to the direction of combustion gas flow through said transition piece;

wherein a central portion only of said transition piece comprises a plurality of rows of said cooling holes.

3. The cooling construction of a transition piece of a gas turbine according to claim 2 wherein said gas turbine is provided with a plurality of said transition pieces, the cooling construction further comprising transition piece seals that are provided at said transition pieces respectively, wherein end portions of said transition piece seals have protrusions mounted so as to overlap each other.

4. The cooling construction of a transition piece of a gas turbine according to claim 1 wherein said gas turbine is provided with a plurality of said transition pieces, the cooling construction further comprising transition piece seals that are provided at said transition pieces respectively, wherein end portions of said transition piece seals have protrusions mounted so as to overlap each other.

5. The cooling construction of a transition piece of a gas turbine according to claim 1, wherein said second protrusion is provided on a combustion gas upstream side of said first protrusion, and said second protrusion has a shape of a brim extending toward the gas turbine inside diameter side.

6. The cooling construction of a transition piece of a gas turbine according to claim 1, wherein said impingement-cooling plate is biased at said other end thereof in a direction orthogonal to the main stream direction of said transition piece by an elastic force of said elastic plate so as to keep said other end contacted with said pin.

* * * * *